United States Patent
Beck et al.

(10) Patent No.: US 11,328,828 B2
(45) Date of Patent: May 10, 2022

(54) METHOD FOR DISMANTLING A STEAM GENERATOR OR HEAT EXCHANGER, IN PARTICULAR A STEAM GENERATOR OR HEAT EXCHANGER OF A NUCLEAR POWER PLANT

(71) Applicant: Framatome GmbH, Erlangen (DE)

(72) Inventors: Jens Beck, Veitsbronn (DE); Georg Kraemer, Wiesenttal (DE); Peter Gerner, Erlangen (DE)

(73) Assignee: Framatome GmbH, Erlangen (DE)

( * ) Notice: Subject to any disclaimer, the term of this patent is extended or adjusted under 35 U.S.C. 154(b) by 597 days.

(21) Appl. No.: 16/344,917

(22) PCT Filed: Nov. 21, 2017

(86) PCT No.: PCT/EP2017/079961
§ 371 (c)(1),
(2) Date: Apr. 25, 2019

(87) PCT Pub. No.: WO2018/095925
PCT Pub. Date: May 31, 2018

(65) Prior Publication Data
US 2019/0267147 A1    Aug. 29, 2019

(30) Foreign Application Priority Data

Nov. 22, 2016    (DE) ..................... 10 2016 122 513.4

(51) Int. Cl.
*G21F 9/30*    (2006.01)
*G21D 1/00*    (2006.01)
*G21F 9/28*    (2006.01)

(52) U.S. Cl.
CPC ............. *G21F 9/307* (2013.01); *G21D 1/006* (2013.01); *G21F 9/28* (2013.01); *F28F 2265/18* (2013.01); *Y02E 30/30* (2013.01)

(58) Field of Classification Search
CPC .................................. G21F 9/307; G21F 9/28
See application file for complete search history.

(56) References Cited

U.S. PATENT DOCUMENTS 4,270,258 A * 6/1981 Andrews ............... F22B 37/002
29/890.031
4,326,317 A * 4/1982 Smith ....................... F28G 3/08
122/379

(Continued)

FOREIGN PATENT DOCUMENTS

DE    69302290 T2    9/1996
DE    19753124 A1    6/1999

(Continued)

*Primary Examiner* — Nathaniel Herzfeld
(74) *Attorney, Agent, or Firm* — Dilworth IP, LLC

(57) ABSTRACT

A method for dismantling a steam generator or heat exchanger, such as found in nuclear power plants, which steam generator or heat exchanger includes a plurality of primary circuit tubes with a contaminated inner surface and wherein one or more tubes are sealed with a plug at both end is provided, the method comprising
a) opening one or both ends of each sealed tube by creating an opening in or removing, the plug (13);
b) introducing a viscous polymer to cure inside the tube wherein the polymer fills the tube across the full tube cross-section at least at the tube ends, immobilizing contaminations in the filled portion inside the tube (11);
c) curing the polymer, then detaching the tubes with cured polymer the detached tubes being sealed by the polymer
d) sorting out the detached tubes with polymer.

20 Claims, 1 Drawing Sheet

(56) References Cited

U.S. PATENT DOCUMENTS

| | | | | |
|---|---|---|---|---|
| 4,390,042 A | * | 6/1983 | Kucherer | F28F 11/02 |
| | | | | 138/89 |
| 4,645,581 A | * | 2/1987 | Voggenthaler | C25F 3/16 |
| | | | | 204/237 |
| 4,847,038 A | * | 7/1989 | Martin | G21D 1/006 |
| | | | | 376/260 |
| 4,905,630 A | * | 3/1990 | Weber | F22B 37/002 |
| | | | | 122/32 |
| 5,347,557 A | * | 9/1994 | Operschall | B08B 9/035 |
| | | | | 376/316 |
| 2004/0131137 A1 | * | 7/2004 | Bernard | B05B 14/00 |
| | | | | 376/310 |

FOREIGN PATENT DOCUMENTS

| | | |
|---|---|---|
| DE | 10137284 A1 | 2/2003 |
| EP | 0192543 A1 | 8/1986 |
| FR | 3002363 A1 | 8/2014 |
| JP | H03113398 A | 5/1991 |

\* cited by examiner

METHOD FOR DISMANTLING A STEAM GENERATOR OR HEAT EXCHANGER, IN PARTICULAR A STEAM GENERATOR OR HEAT EXCHANGER OF A NUCLEAR POWER PLANT

The invention relates to a method for dismantling a steam generator or heat exchanger, in particular a steam generator or heat exchanger of a nuclear power plant.

BACKGROUND OF THE INVENTION

Such steam generators or heat exchangers include a plurality of primary circuit tubes with contaminated inner tube surfaces, one or more of said tubes being closed with a respective plug at both ends.

The nuclear reactor of a nuclear power plant contains the reactor core, which consists of fuel elements in which nuclear energy is released through controlled nuclear fission and radioactive decay and is converted into heat. This heat heats a coolant which is pumped through the reactor thereby carrying the energy out of the reactor. The coolant is then supplied to a steam generator, and the generated steam drives the turbines of the power plant.

The steam generator transfers the heat of the reactor coolant to the water-steam circuit. Configured as tube bundle heat exchangers, these steam generators convert feed water into live steam for driving the turbines.

The collecting chamber is connected to the main coolant lines of the reactor cooling system via inlet and outlet nozzles. Coming from the collecting chamber, the reactor coolant flows through the tubes while emitting heat and reaches the outlet chamber, from where it is supplied to the main coolant pump.

The tube bundle is connected to the tube sheet of the steam generators. The tubes of a steam generator may be up to 20 meters in length. In natural circulation, the entering feed water flows upward inside the tube bundle. In the steam dome located above the tube bundle, the residual steam moisture is separated, and the dried steam is then led out via the outlet nozzle.

In nuclear power plants, the inner surfaces of the tubes of the steam generators are contaminated during operation of the plant. The integrity of the tubes is ensured through regular inspections. If an inspection reveals damage such as a reduced wall thickness, both sides of the affected tube, i.e. the inlet end as well as the outlet end, are sealed with plugs in the region of the tube sheet as a precaution. As a result, the surface contamination is also encapsulated.

When the steam generator is dismantled, the tubes are decontaminated in a preceding step, for example through mechanical or chemical processes. Since the tubes which have been sealed with the plugs are not accessible to such decontamination, the problem arises that these tubes cannot be processed further, i.e. dismantled, without additional steps.

SUMMARY OF THE INVENTION

The object of the invention is therefore to provide a method which prevents contaminations present on the inner surfaces of the tubes from escaping from the tubes during dismantling of the steam generator or heat exchanger.

This object is achieved with a method for dismantling a steam generator or heat exchanger comprising the features according to claim 1. Advantageous configurations and modifications are specified in the respective dependent claims.

The method according to the invention comprises the steps of:
a) opening one or both ends of each sealed tube by creating an opening in the respective plug or by removing the respective plug;
b) introducing a viscous polymer which will cure inside the tube into the initially sealed and now opened tubes, said polymer filling the tube across the full tube cross-section at least in the region of the tube ends and immobilizing contaminations in the filled portion inside the tube;
c) detaching the tubes provided with polymer after the polymer has cured, the detached tubes being sealed by the cured polymer;
d) sorting out the detached tubes provided with the polymer.

By introducing a polymer which cures inside the tubes, the loose contamination is retained inside the tube and cannot escape when the tube is detached.

In the close-down of nuclear power plants, it has become a widely established practice to perform a so-called "full system decontamination" as a last step before shutdown. Since radioactive waste is very expensive, attention needs to be paid to creating a minimum amount of "highly radioactive waste". The open tubes which are not provided with plugs and the sealed tubes filled with the polymer belong to different waste categories, so that the sealed tubes filled with the polymer are sorted out and disposed of separately from the open tubes that are not provided with plugs.

The advantages of the invention consist in particular in the fact that any type of chemical or mechanical treatment of the contaminated tubes can be avoided through the method according to the invention. Due to the damage already existing in the tubes, such a treatment of the tubes always involves the risk that the tubes will break and thereby cause contamination to be carried over to the secondary side. Such a carry-over of contamination is to be avoided by all means since the secondary side is strictly free of contamination.

A further advantage of the invention is that the method is, on the one hand, much more cost-effective than known alternative methods and, on the other hand, provides a high level of safety.

According to an advantageous modification of the invention, a cross-linking polymer is used, in particular a polymer which performs cross-linking through polyaddition and consists of or comprises, for example, silicone and/or polyurethane and/or epoxy resin.

According to an embodiment variant of the invention, the interior of the tube may be filled completely with the polymer. Further, according to an alternative embodiment variant of the invention, the interior of the tube may be filled with the polymer in the region of the two tube ends, for example from the tube end up to 0.5 meters beyond a tube sheet.

"Completely" may be understood to mean that the complete interior of the tube from one tube end to the other is filled with the polymer. In other words, no hollow spaces or empty regions are to remain inside the tube. "In the region of the tube ends" may be understood to mean that the introduced polymer extends from the tube end into the tube, for example up to 0.5 meters beyond the tube sheet, at both ends. In other words, a hollow space or empty region remains between the two filled regions.

The polymer may be introduced using one or more lines, wherein a line is inserted into the tube through an opened tube end or a respective line is inserted through each respective opened tube end of a tube. Said line may be, for example, a hose or a flexible tube.

To deliver the line or lines to the tube end or tube ends, they may be delivered to the steam generator or heat exchanger via the manholes or the loop lines.

Such lines should have a maximum possible inner diameter to obtain a minimum frictional resistance of the polymer, which still has a low viscosity at that time, while being injected through the lines.

The polymer is introduced in particular using pressure, said pressure preferably being generated by a pressure unit connected to the polymer blender. The pressure applied by said unit may range between 1 bar of excess pressure and 150 bars of excess pressure. This depends on the conditions, such as the diameter and/or the length of the tube and the line.

According to an embodiment variant, the tubes are U-shaped tubes both ends of which end in a tube sheet, wherein a line is inserted through one of the opened tube ends and is then led to the turning point of the U-shaped tube, and wherein the polymer is then injected into the tube through the line, the line being retracted from the tube while injecting the polymer until the interior of the corresponding half of the tube is filled with polymer.

According to an alternative embodiment variant, the tubes are U-shaped tubes both ends of which end in a tube sheet, wherein a line is inserted through one of the opened tube ends and is then led into the tube as far as about 0.5 meters beyond the tube sheet, and wherein the polymer is then injected into the tube through the line, the line being retracted from the tube while injecting the polymer until the corresponding portion of the tube is filled with polymer.

In both embodiment variants, the second half or the second portion of the tube may be filled with polymer through the second open tube end in a like manner simultaneously with or subsequently to the injection of the polymer into said corresponding half or into said corresponding portion of the U-shaped tube.

According to a modification of the invention, all tubes which are not sealed with plugs may be decontaminated, in particular through mechanical or chemical cleaning processes, for example through abrasive processes such as blasting processes, or through scavenging processes using solvents, prior to opening the sealed tubes.

The openings may be created in the plugs by drilling, in particular using a two-stage drilling process, in order to avoid loose pieces. The opening may also be created by milling or eroding or other suitable processes. The openings may have a minimum diameter of, for example, 5 mm. The maximum diameter preferably corresponds roughly to the inner diameter of the tube, i.e. the plug is removed completely. The tubes may have inner diameters of about 10 to 20 mm.

The detaching of the tubes provided with the polymer preferably also involves detaching the open tubes which are not provided with plugs and subsequently sorting out the tubes provided with polymer.

According to a preferred and expedient modification of the invention, the tubes provided with polymer and/or the open tubes not provided with plugs are detached directly at or near a tube sheet or at the level of a tube sheet, in particular by sawing, said detaching being performed along a provided separation line which is preferably orthogonal to the vertically extending tubes. As an alternative, it is also possible to detach the tubes in a lying position. The separation line may, however, also be provided so as to extend through a tube sheet.

The tubes completely filled with polymer are preferably segmented into multiple pieces, preferably after detachment, said segmenting being performed through cutting and/or sawing and/or thermal separation processes. Such segmenting facilitates the further processing, i.e. the transport of the tubes, which have a considerable length of up to 20 meters in the non-segmented state.

The detached and sorted tubes provided with the polymer may be treated and/or disposed of as radioactive waste.

Additionally or alternatively, the open tubes not provided with plugs may be treated and/or disposed of as less radioactive waste or non-radioactive waste after dismantling.

The detached and sorted tubes provided with the polymer and the open tubes not provided with plugs may be assigned to different waste categories and disposed of separately.

The invention will be explained in more detail below, also with respect to further features and advantages, by the description of embodiments and by reference to the accompanying drawing. FIG. 1 shows a simplified schematic representation of a steam generator 10 with which the method according to the invention for dismantling a steam generator 10 can be carried out. For reasons of clarity, the steam generator is shown to contain merely one primary circuit tube 11, which is shown enlarged. Normally, however, a steam generator will comprise a plurality of tubes 11, for example several thousands of such tubes 11.

DETAILED DESCRIPTION OF THE INVENTION

Figure 1:
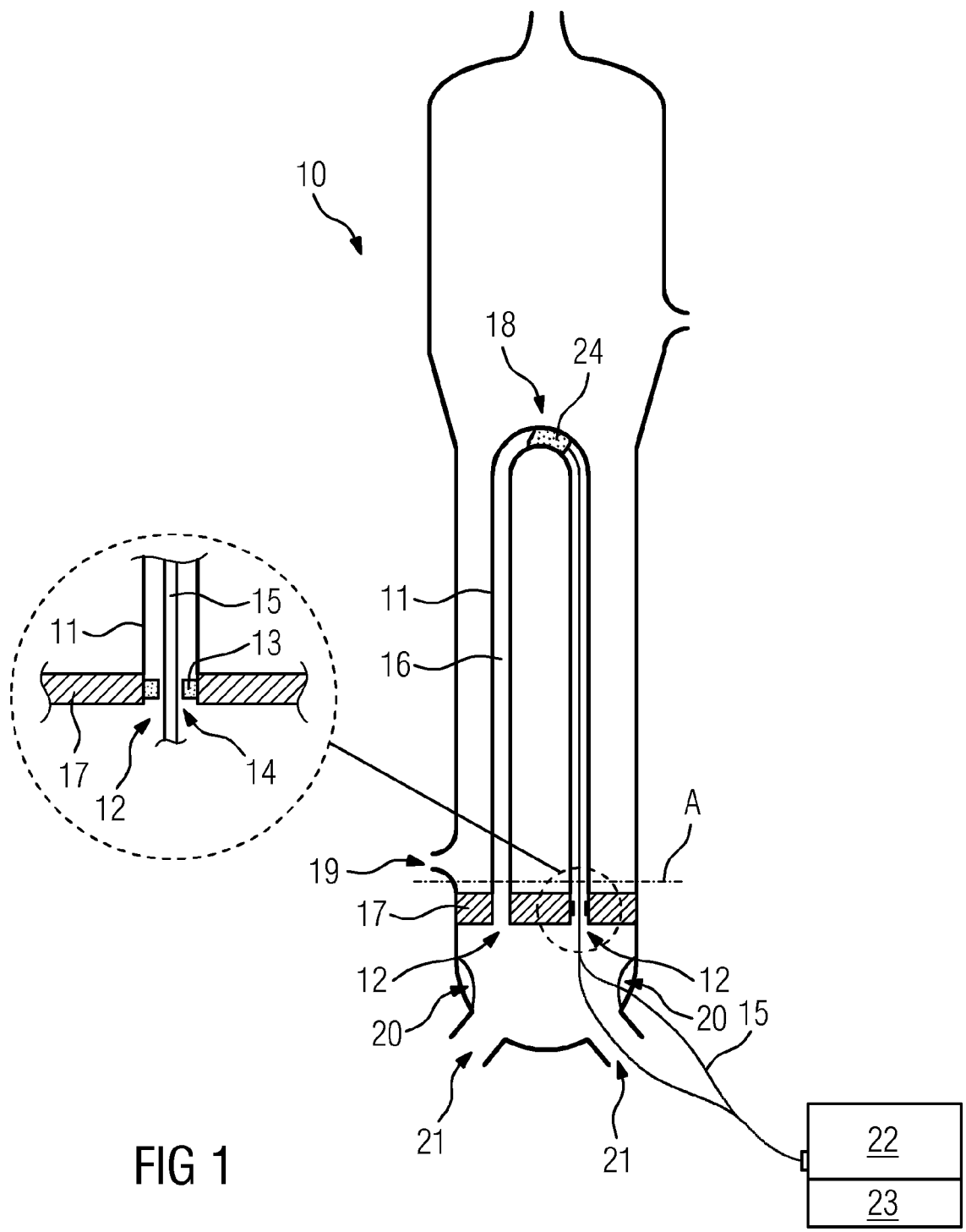
FIG. 1 shows a steam generator 10 of a nuclear power station (not shown), said steam generator 10 including a plurality of primary circuit tubes 11 (FIG. 1 shows merely one such tube 11 by way of example) with contaminated inner tube surfaces, wherein one or more of the tubes 11 were previously sealed with a plug 13 at both tube ends. In the initial state, i.e. the state in which the method starts, the tube ends 12 are still sealed with a plug 13.

The method according to the invention initially involves opening one or both ends 12 of each sealed tube 11 by creating an opening 14 in the respective plug 13 or by removing the respective plug 13. FIG. 1 shows a tube 11 both ends 12 of which have been opened, the right end 12 by creating an opening 14 in the plug 13, and the left end 12 by removing the plug 13.

The openings 14 in the plugs 13 are preferably created by drilling, in particular using a two-stage drilling process, in order to avoid loose pieces. However, milling or eroding processes are also possible instead of drilling.

Prior to opening the sealed tubes 11, all tubes 11 which are not provided with plugs 13 are preferably decontaminated through mechanical or chemical cleaning processes, for example through abrasive processes such as blasting processes, or through scavenging processes using solvents.

After opening one or both ends 12 of each sealed tube 11, a viscous polymer 24 which will cure inside the tube 11 is introduced into the initially sealed and now opened tube or tubes 11. The polymer 24 fills the tube 11 across the full tube cross-section at least in the region of the tube ends 12 and immobilizes contaminations in the filled portion inside the tube 11.

The polymer used is a polymer 24 which performs crosslinking through polyaddition and consists of or comprises, for example, silicone and/or polyurethane and/or epoxy resin.

Two variants for introducing the polymer will now be explained:

According to the first variant, the interior 16 of the tube is filled completely with the polymer 24. This is done by introducing the polymer 24 using a line 15 configured as a hose, wherein said hose 15 is inserted through an opened tube end 12.

To deliver the hose 15 to the tube end 12, it may be delivered to the steam generator 10 via the manhole 20 and/or the loop lines 21. The polymer 24 is introduced in particular using pressure, said pressure being generated by a pressure unit 23 connected to the polymer blender 22.

The tubes 11 of the steam generator 10 are U-shaped tubes 11 both ends 12 of which end in a tube sheet 17. The hose 15 is inserted through one of the opened tube ends 12, in FIG. 1 the right tube end 12, and is then led to the turning point 18 of the U-shaped tube 11. The polymer 24 is then injected into the tube 11 through the hose 15, the hose 15 being retracted from the tube 11 while injecting the polymer 24 until the interior 16 of the corresponding half of the tube 11 is filled with polymer 24. FIG. 1 shows the beginning of the injection process. A part of the tube 11 has already been provided with polymer, and the hose 15 has already been retracted from the tube 11 to some extent.

Simultaneously with or subsequently to, in FIG. 1 subsequently to, the injection of the polymer 24 into the corresponding half of the U-shaped tube, the second half of the tube 11 is filled with polymer 24 through the second opened tube end 12 in a like manner.

According to the second variant, which is not shown in FIG. 1, the interior 16 of the tube is filled with the polymer 24 in the region of the two tube ends 12, for example over a length of about 0.5 meters, measured from the upper end of the tube sheet. This is done by introducing polymer 24 using two hoses 15, wherein a respective hose 15 is inserted into a tube 11 through each respective opened tube end 12 of said tube 11.

The tubes 11 are U-shaped tubes 11 both ends 12 of which end in a tube sheet 17, wherein a hose 15 is inserted into the tube 11 through one of the opened tube ends 12 and is then led into the tube 11 as far as about 0.5 meters, measured from the upper end of the tube sheet. The polymer 24 is then injected into the tube 11 through the hose 15, the hose 15 being retracted from the tube 11 while injecting the polymer 24 until the corresponding portion of the tube 11 is filled with polymer 24.

Simultaneously with or subsequently to the injection of the polymer 24 into the corresponding portion of the U-shaped tube 11, the second portion of the tube 11 is filled with polymer 24 through the second opened tube end 12 in a like manner.

Once the polymer 24 has cured, the tubes 11 provided with polymer 24 are detached. At this time, the detached tubes 11 are sealed by the cured polymer 24.

The detaching of the tubes 11 provided with the polymer 24 preferably also involves detaching the open tubes 11 which are not provided with plugs 13.

The tubes 11 provided with polymer 24 as well as the open tubes 11 not provided with plugs 13 are detached by sawing directly at or near the tube sheet 17, said detaching being performed along a provided separation line A which is orthogonal to the vertically extending tubes 11. As an alternative, the separation line may, however, also be provided so as to extend through the tube sheet (not shown).

The detached tubes 11 provided with the polymer 24 are then sorted out.

After detachment, the tubes 11 completely filled with polymer 24 are segmented into multiple pieces, said segmenting being performed by sawing or other separation processes.

The detached and sorted tubes 11 provided with the polymer 24 are treated and disposed of as radioactive waste. The open tubes 11 not provided with plugs 13 are treated and disposed of as less radioactive waste or non-radioactive waste after dismantling.

LIST OF REFERENCE NUMERALS 10 steam generator
11 tube
12 tube end
13 plug
14 opening in plug
15 hose
16 interior
17 tube sheet
18 turning point
19 hand hole
20 manhole
21 loop line
22 polymer blender
23 pressure unit
24 polymer
A separation line

The invention claimed is:

1. A method for dismantling a steam generator or heat exchanger, said steam generator or heat exchanger including a plurality of primary circuit tubes having an interior with a contaminated inner tube surface, wherein one or more of said tubes are sealed with a plug at both tube ends, the method comprising the steps of:
   a) opening one or both ends of each sealed tube by creating an opening in the respective plug or by removing the respective plug;
   b) introducing a viscous polymer which will cure inside the tube into the initially sealed and now opened tube or tubes, said polymer filling the tube across the full tube cross-section at least in a region of the tube ends and immobilizing contaminations in the filled portion inside the tube;
   c) curing the polymer, then detaching the tubes provided with the polymer, the detached tubes being sealed by the cured polymer;
   d) sorting out the detached tubes provided with the polymer.

2. The method according to claim 1, characterized in that the viscous polymer is a cross-linking polymer which performs cross-linking through polyaddition and comprises, a silicone and/or polyurethane and/or epoxy resin.

3. The method according to claim 1, characterized in that the interior of the tube is filled completely with the polymer, or the interior of the tube is filled with the polymer in a region from each tube end up to 0.5 meters beyond a tube sheet.

4. The method according to claim 1, characterized in that the polymer is introduced using one or more lines, wherein a line is inserted into the tube through an opened tube end or a respective line is inserted through each respective opened tube end of a tube.

5. The method according to claim 4, characterized in that the tubes are U-shaped tubes both ends of which end in a tube sheet, wherein a line is inserted through one of the opened tube ends and is then led to the turning point of the U-shaped tube, and wherein the polymer is then injected into the tube through the line, while the line is being retracted from the tube until the interior of the corresponding half of the tube is filled with polymer.

6. The method according to claim 4, characterized in that the tubes are U-shaped tubes both ends of which end in a tube sheet, wherein a line is inserted into the tube through one of the opened tube ends and is then led into the tube as far as about 0.5 meters beyond the tube sheet, and wherein the polymer is then injected into the tube through the line, while the line is being retracted from the tube until the corresponding portion of the tube is filled with polymer.

7. The method according to claim 5, characterized in that simultaneously with, or subsequently to, the injection of the polymer into the corresponding half of the U-shaped tube, the second half is filled with polymer through another opened tube end in a like manner.

8. The method according to claim 1, characterized in that prior to opening the sealed tubes, all tubes which are not provided with plugs are decontaminated, through mechanical or chemical cleaning processes.

9. The method according to claim 1, characterized in that the openings in the plugs are created by drilling.

10. The method according to claim 1, characterized in that the detaching of the tubes provided with the polymer also involves detaching the open tubes which are not provided with plugs and subsequently sorting out the tubes provided with polymer.

11. The method according to claim 1, characterized in that the tubes provided with polymer and/or the open tubes not provided with plugs are detached directly at or near a tube sheet or at the level of a tube sheet, said detaching being performed along a provided separation line (A).

12. The method according to claim 3, characterized in that the tubes completely filled with polymer are segmented into multiple pieces, said segmenting being performed through cutting and/or sawing and/or thermal separation processes.

13. The method according to claim 1, characterized in that the detached and sorted tubes provided with the polymer are treated and/or disposed of as radioactive waste, and/or the open tubes not provided with plugs are treated and/or disposed of as less radioactive waste or non-radioactive waste after dismantling.

14. The method according to claim 1 wherein the steam generator or heat exchanger is a steam generator or heat exchanger of a nuclear power plant.

15. The method according to claim 6, characterized in that simultaneously with, or subsequently to, the injection of the polymer into the corresponding portion of the U-shaped tube, the second portion of the tube is filled with polymer through the second opened tube end in a like manner.

16. The method according to claim 8 characterized in that prior to opening the sealed tubes, all tubes which are not provided with plugs are decontaminated through abrasive processes or through scavenging processes using solvents.

17. The method according to claim 9, characterized in that the openings in the plugs are created by a two-stage drilling process to avoid loose pieces.

18. The method according to claim 11, characterized in that the tubes provided with polymer and/or the open tubes not provided with plugs are detached directly at or near a tube sheet or at the level of a tube sheet by sawing.

19. The method according to claim 11, characterized in that the provided separation line (A) is orthogonal to the vertically extending tubes.

20. The method according to claim 3, characterized in that the tubes completely filled with polymer are segmented into multiple pieces after detachment.

\* \* \* \* \*